(12) United States Patent
Song et al.

(10) Patent No.: US 8,948,164 B2
(45) Date of Patent: Feb. 3, 2015

(54) TERMINAL, METHOD AND SYSTEM FOR PERFORMING COMBINATION SERVICE USING TERMINAL CAPABILITY VERSION

(71) Applicant: LG Electronics Inc., Seoul (KR)

(72) Inventors: Jae-Seung Song, Seoul (KR); Song-Rae Cho, Seoul (KR); Kyung-Ae Yoon, Anyang (KR); Hyun-Sook Kim, Seoul (KR); Se-Hee Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/791,446

(22) Filed: Mar. 8, 2013

(65) Prior Publication Data

US 2013/0208716 A1    Aug. 15, 2013

Related U.S. Application Data

(63) Continuation of application No. 11/443,212, filed on May 31, 2006, now Pat. No. 8,401,004.

(60) Provisional application No. 60/692,665, filed on Jun. 21, 2005.

(30) Foreign Application Priority Data

Mar. 9, 2006    (KR) .................. 10-2006-0022404

(51) Int. Cl.
*H04W 80/10*    (2009.01)
*H04L 29/06*    (2006.01)
(Continued)

(52) U.S. Cl.
CPC ............... *H04L 65/40* (2013.01); *H04W 8/22* (2013.01); *H04W 76/022* (2013.01); *H04W 76/026* (2013.01); *H04W 80/04* (2013.01); *H04W 80/10* (2013.01)
USPC .......................................... 370/354; 370/352

(58) Field of Classification Search
CPC ............ H04L 65/1006; H04L 65/1016; H04L 65/1059; H04W 80/10
See application file for complete search history.

(56) References Cited

U.S. PATENT DOCUMENTS

| 5,715,257 A | 2/1998 | Matsuki et al. |
| 5,905,958 A | 5/1999 | Houde et al. |

(Continued)

FOREIGN PATENT DOCUMENTS

| CN | 1128920 A | 8/1996 |
| JP | 11-55425 A | 2/1999 |

(Continued)

OTHER PUBLICATIONS

"3RD Generation Partnership Project; Technical Specification Group Core Network and Terminals; Combining Circuit Switches (CS) and IP Multimedia Subsystem (IMS) services; Stage 3 (Release 7)" 3GPP Standard; 3GPP TS 24.279, 3rd Generation Partnership Project (3GPP) Mobile Competence Centre; (Mar. 1, 2006), pp. 1-56, XP050365175.

(Continued)

*Primary Examiner* — Melanie Jagannathan
*Assistant Examiner* — Jason Harley
(74) *Attorney, Agent, or Firm* — Birch, Stewart, Kolasch & Kolasch, LLP

(57) ABSTRACT

A terminal, method and system for providing a CS service, a SIP-based service, or a CSI service, are provided. According to an embodiment, the terminal includes a controller to receive a terminal capability version of at least one target terminal, to compare the received terminal capability version with a previously stored terminal capability version of the at least one target terminal, and to determine whether to request for terminal capability information of the at least one target terminal based on the comparison result, wherein the terminal capability version identifies a version of capabilities of the at least one target terminal.

18 Claims, 8 Drawing Sheets

| | CAPABILITY SET | UNIQUE CAPABILITY VERSION |
|---|---|---|
| EX 1 | SCREEN CAPABILITIES : 256 COLOR, 640x486 RESOLUTION<br>MEMORY : 256 MB<br>CODEC TYPES : EFR,AMR,MPEG4,H.264<br>BROWSER TYPES : WAP 1.2<br>etc. | GENERATE CAPABILITY VERSION BY INPUTTING CAPABILITY SETS IN HASH FUNCTION<br>CAPABILITY VERSION : 0100 1000 |
| EX 2 | UPON ADDING CAMERA FUNCTION | RESULT OF GENERATING CAPABILITY VERSION BY INPUTTING CAPABILITY SET ADDING CAMERA FUNCTION<br>CAPABILITY VERSION : 1011 1001 |
| EX 3 | UPON UPDATING BROWSER TYPE TO WAP 2.0 | RESULT OF GENERATING CAPABILITY VERSION BY INPUTTING CAPABILITY SET HAVING BROWSER TYPE CHANGED INTO WAP 2.0<br>CAPABILITY VERSION : 0101 1000 |

(51) Int. Cl.
*H04W 8/22* (2009.01)
*H04W 76/02* (2009.01)
*H04W 80/04* (2009.01)

(56) References Cited

U.S. PATENT DOCUMENTS

| | | | |
|---|---|---|---|
| 5,956,393 | A * | 9/1999 | Tessler et al. ............. 379/197 |
| 6,539,030 | B1 | 3/2003 | Bender et al. |
| 2001/0046234 | A1 * | 11/2001 | Agrawal et al. ............. 370/402 |
| 2002/0126701 | A1 | 9/2002 | Requena |
| 2002/0165966 | A1 * | 11/2002 | Widegren et al. ............ 709/226 |
| 2002/0191596 | A1 | 12/2002 | Moyano et al. |
| 2003/0065799 | A1 | 4/2003 | Kitamuya |
| 2004/0047437 | A1 | 3/2004 | Hamiti et al. |
| 2004/0076145 | A1 * | 4/2004 | Kauhanen et al. ........... 370/352 |
| 2005/0058125 | A1 * | 3/2005 | Mutikainen et al. .......... 370/354 |

FOREIGN PATENT DOCUMENTS

| | | |
|---|---|---|
| JP | 2001-45453 A | 2/2001 |
| JP | 2002-152830 A | 5/2002 |
| JP | 2003-152820 A | 5/2003 |
| JP | 2004-158947 A | 6/2004 |
| RU | 2002109227 A | 11/2003 |
| WO | WO 01/19096 A1 | 3/2001 |
| WO | WO 01-58108 A2 | 8/2001 |
| WO | WO 03/003767 A1 | 1/2003 |
| WO | WO 2005/018200 A1 | 2/2005 |

OTHER PUBLICATIONS

SA WG2: "Cover Sheet for TR 23.279 V 2.0.0" 3GPP Draft; SP-050344, Generation Partnership Project(3GPP), Mobile Competence Centre; vol. TSG SA, No. Quebec, Canada; May 30, 2005, XP050205036.

Siemens AG: "TR 24.879—Exchange of UE Capability information Correction" 3GPP Draft; C1-051231.(CAPS_EX), 3rd Generation Partnership Project (3GPP), Mobile Competence Centre; vol. CT WG1, No. Cannes, France; Oct. 5, 2005, XP050021361.

WO 03/003767 A1 (Nokia Corp [FI]; Soininen Jonne [FI]; Uskela Sami [FI]' Honko Harri (F) (Jan. 9, 2003), p. 5, line 12—p. 12, line 13.

* cited by examiner

FIG. 4

| | CAPABILITY SET | UNIQUE CAPABILITY VERSION |
|---|---|---|
| EX 1 | SCREEN CAPABILITIES : 256 COLOR, 640x486 RESOLUTION<br>MEMORY : 256 MB<br>CODEC TYPES : EFR,AMR,MPEG4,H.264<br>BROWSER TYPES : WAP 1.2<br>etc. | GENERATE CAPABILITY VERSION BY INPUTTING CAPABILITY SETS IN HASH FUNCTION<br>CAPABILITY VERSION : 0100 1000 |
| EX 2 | UPON ADDING CAMERA FUNCTION | RESULT OF GENERATING CAPABILITY VERSION BY INPUTTING CAPABILITY SET ADDING CAMERA FUNCTION<br>CAPABILITY VERSION : 1011 1001 |
| EX 3 | UPON UPDATING BROWSER TYPE TO WAP 2.0 | RESULT OF GENERATING CAPABILITY VERSION BY INPUTTING CAPABILITY SET HAVING BROWSER TYPE CHANGED INTO WAP 2.0<br>CAPABILITY VERSION : 0101 1000 |

…

TERMINAL, METHOD AND SYSTEM FOR PERFORMING COMBINATION SERVICE USING TERMINAL CAPABILITY VERSION

The present application is a 37 C.F.R. §1.53(b) continuation of co-pending U.S. patent application Ser. No. 11/443,212 filed May 31, 2006, which claims priority on Korean Patent Application No. 10-2006-0022404, filed Mar. 9, 2006, and also claims the priority benefit of U.S. Provisional Application No. 60/692,665 filed on Jun. 21, 2005. The entire contents of all of the above applications are hereby incorporated by reference.

BACKGROUND OF THE INVENTION

1. Field of the Invention

The present invention relates to a combination service for simultaneously performing two or more services, and particularly, to a terminal, method and system for performing a combination service using terminal capability version information of the terminal.

2. Discussion of the Related Art

A combination service is a service in which two or more services are simultaneously performed between a first user and a second user. The combination service can also indicate a service for combining at least two or more of a first service based upon a first network, a second service based upon a second network, and a third service based upon a third network, and then for simultaneously performing the combined services between two or more users.

In order to perform the combination service between the first and second users, the first and second users need to respectively understand information related to supportable services of the other party and then negotiate available services therebetween.

Among the different types of combination services, a Combination of a CS service and an IMS service (CSI) will now be explained as an exemplary combination service.

The CSI (also referred to herein as CSI service) indicates a service in which a Circuit Switched (CS) service and an IP Multimedia Subsystem (IMS) service are combined (united) with each other and then the combined services are simultaneously performed between two or more users/terminals. In the CSI, an IMS session for an IMS service can be added to a CS call already set between first and second users, or a CS call can be added to an IMS session already set between the first and second users. The IMS service, which may be added to the CS call preset between the first and second users, can include one or more of IMS based services such as an Instant Messaging (IM), a video sharing, a data delivery, etc. One example of the CSI (combination of CS and IMS services) can be carrying out a mobile phone conversation (CS service) between a user at mobile terminal A and another user at mobile terminal B and while talking, transmitting a video clip or pictures (IMS service) from the mobile terminal A to the mobile terminal B.

FIG. 1 illustrates a network construction for providing a general combination service, for example, the CSI, between first and second terminals according to a related art. As illustrated in FIG. 1, a general network for providing the combination service such as the CSI can include first and second CS core networks 31 and 32 to support a CS service for the CSI between a first terminal 10 and a second terminal 20, first and second IMS core networks 41 and 42 to support an IMS service for the CSI between the first and second terminals 10 and 20, a first Application Server (AS) 43 connected to the first IMS core network 41 to perform a particular function of the IMS session for the CSI related to the first terminal 10 such as a service based accounting function, a second AS 44 connected to the second IMS core network 42 to perform the particular function of the IMS session for the CSI (e.g., the service based accounting function), a first x-radio access network xRAN 30 for the first terminal 10 to access the first CS core network 31 and the first IMS core network 41 (and vice versa), and a second xRAN 33 for the second terminal 20 to access the second CS core network 32 and the second IMS core network 42 (and vice versa).

The general network for providing the CSI or the like can further include a first Packet Switched (PS) core network 40 connected between the first xRAN 30 and the first IMS core network 41 to set an IMS session of the CSI, and a second PS core network 45 connected between the second xRAN 33 and the second IMS core network 42 to set the IMS session of the CSI.

Each of the first and second CS core networks 31 and 32 can include a Mobile Switching Center (MSC), a Visiting Location Register (VLR), and a Home Location Register (HLR).

A general CSI providing method in the general network of FIG. 1 will now be explained.

For a CS call between the first and second terminals 10 and 20, data and control signals are exchanged therebetween via the first and second CS core networks 31 and 32. For an IMS session, exchange of data and control signals is performed via the first PS core network 40 and the first IMS core network and via the second IMS core network 42 and the second PS core network 45.

The first terminal 10 has a function to simultaneously access the first CS core network 31 and the first PS core network 40, while the second terminal 20 has a function to simultaneously access the second CS core network 32 and the second PS core network 45.

Before initiating the CSI service between the first and second terminals 10 and 20, the first and second terminals 10 and 20 exchange with each other current radio environment information and terminal capability information, and thus respectively obtain information related to supportable services with respect to the other party.

The current radio environment information of the terminal is used as important information required to determine user's activities after setting the CS call. The radio environment information exchange occurs over a CS domain during the CS call setup. The radio environment information is flexible and can be different depending on an environment when the CS call is set. Accordingly, the exchanged radio environment information is used as information valid only during the lifetime of the CS call. The radio environment information may contain information related to whether a terminal can support simultaneous CS and PS services such as the CSI.

The terminal capability information is information identifying capabilities of the terminal, and is used as information for determining whether a user who is in communication with another party would call available services for that party. The terminal capability information exchange occurs over an IMS domain.

FIG. 2 illustrates a general method for exchanging terminal capability information between the first and second terminals 10 and 20 in the general network of FIG. 1.

Referring to FIG. 2, the first terminal 10 sends a Session Initiation Protocol (SIP) OPTIONS message to the second terminal 20, through the first and second IMS core networks 41 and 42, to request capability information of the second terminal 20 (S21). The second terminal 20 then stores address information of the first terminal 10 contained in the received OPTIONS message (S22), and then sends a 200 OK message to the first terminal 10 in response to the SIP OPTIONS message. The 200 OK message contains the terminal capability information of the second terminal 20 (S23).

The first terminal 10 having received the 200 OK message stores the terminal capability information of the second terminal 20 contained in the 200 OK message (S24).

On the other side, in case that the second terminal 20 has received the OPTIONS message from the first terminal 10 but has not sent an OPTIONS (SIP OPTIONS) message to the first terminal 10 for requesting the terminal capability information of the first terminal 10, the second terminal 20 determines to send the OPTIONS message to the first terminal 10 (S25). Upon receiving the OPTIONS message for requesting the terminal capability information of the first terminal 10 from the second terminal 20, the first terminal 10 stores the address information of the second terminal 20 contained in the received OPTIONS message (S26 and S27), and sends a 200 OK message to the second terminal 20 in response to the received OPTIONS message (S28). This 200 OK message contains the capability information of the first terminal 10.

The second terminal 20 then stores the capability information of the first terminal 10 contained in the 200 OK message sent from the first terminal 10 (S29).

Accordingly, the terminal capability information of the first terminal 10 and that of the second terminal 20 exchanged therebetween are stored in the second terminal 20 and the first terminal 10, respectively, so as to provide a fast service setup and to reduce network loads during the subsequent communication therebetween.

According to the related art method discussed above, in order for a particular terminal to obtain terminal capability information of its counterpart terminal, the particular terminal needs to send an OPTIONS message to the counterpart terminal to thus request the terminal capability information of the counterpart terminal, and receive from the counterpart terminal a response message containing the terminal capability information of the counterpart terminal. Based upon this method, the terminal sends an OPTIONS message once (e.g., for a call setup) a counterpart terminal and stores therein the received terminal capability information of its counterpart terminal for subsequent use.

Hence, even in case where the capability information (capabilities) of the counterpart terminal has not changed, the terminal still sends an OPTIONS message once to the counterpart terminal (e.g., for a call setup) to perform the operation of receiving the unchanged terminal capability information of the counterpart terminal. However, it is not necessary since the capability information of the counterpart terminal has not changed and is already stored in the terminal from the previous OPTIONS operation. Further, such an operation may increase the load of the network.

In general, on the other side, the actual capability information related to the terminal may dynamically be updated. Cases in which the terminal capability information (capabilities) may be changed (updated) according to the related art will be explained as follows.

There are three cases in which the actual capability information of the terminal may be changed in that terminal. Namely, there exist a first case where various devices (e.g., a camera, etc.) have dynamically been attached to the terminal and detached therefrom, a second case where the terminal has been registered in an IMS service, and a third case where the terminal has updated its current capability information by downloading a new codec using a downloading service.

After the change of the actual capability information of the terminal, if a cache of the terminal is not updated together due to the power on/off, SIM swap off, time out, and the like, all of which are related to the terminal, then the capability information of the terminal as stored in the cache of that terminal may not accurately reflect the actual capability information (capabilities) of that terminal. Then, since the counterpart terminal receives the stored capability information from the cache of the terminal, the actual capability information of the terminal will not be consistent with the capability information of the terminal as stored in the cache of the counterpart terminal. That is, due to the dynamic change, the actual capabilities of the terminal may not be known to the counterpart terminal.

Accordingly, when the counterpart terminal desires to use a CSI with the terminal later, the counterpart terminal would confirm that the capability information of the terminal has already been stored in the cache of the counterpart terminal, and then immediately send an INVITE message to the terminal after a radio capability exchange therebetween, without performing the sending of the OPTIONS message (i.e., the OPTIONS process) to obtain the capability information of the terminal. The counterpart terminal accordingly requests a PoC service from the terminal. However, since the capabilities of the terminal have changed (e.g., the terminal is not fully capable of performing a PoC service), the terminal de-registers the PoC service, the PoC service fails to be requested, and thereby the counterpart terminal must re-perform the OPTIONS process to obtain the capability information of the terminal. Thus, the previously stored terminal capability information cannot be used in the related art.

In addition, in the current mobile communications system, one subscriber can have multiple terminals, and one public user identity can be used simultaneously at several subscriber identity modules (SIMs) of the terminals. Namely, one subscriber shares a Mobile Station International Subscriber Directory Number (MSISDN) with other terminals for use. In case of a cache which uses only the public user identity, when a request is received, it may not be possible for the receiving terminal to recognize which one of the multiple terminals of the counterpart has sent the request because of the use of the public user identity. Accordingly, the combination service (e.g., the CSI) may not be normally performed with the terminal that has actually sent the request.

SUMMARY OF THE INVENTION

Therefore, an object of the present invention is to provide a terminal or user equipment (UE), method and system for performing a combination service using a terminal capability version, which are capable of simplifying a terminal capability information exchange procedure and a signaling procedure during a connection set-up for a combination service by allowing each terminal to send a terminal capability version thereof.

Another object of the present invention is to provide a terminal/UE, method and system for performing a combination service using a terminal capability version in which whenever terminal capability information of each terminal is changed, each terminal maintains a terminal capability version thereof with a unique value and sends the terminal capability version during a connection set-up for a combination service, whereby whether the terminal capability information of another party has been changed can be correctly determined and the efficiency of a cache usage can be increased by maintaining consistent information in the caches of the involved terminals.

Another object of the present invention is to provide a terminal, system and method of providing a CS service, a SIP-based service (e.g., an IMS service, etc.), or a CSI service, which address the limitations and disadvantages associated with the related art.

To achieve these and other advantages and in accordance with the purpose of the present invention, as embodied and broadly described herein, there is provided according to one aspect a method for performing a combination service in a method for simultaneously performing different services among two or more terminals, the method comprising: exchanging terminal capability versions when requesting a service connection; and comparing a received terminal capability version with a stored terminal capability version to selectively performing a terminal capability information exchange procedure and a service connection setup procedure.

According to another aspect of the present invention, in a system for simultaneously performing different services among two or more terminals, a method for performing a combination service can comprise: generating a terminal capability version based upon terminal capability information; and sending the terminal capability version when requesting a service connection.

To achieve these and other advantages and in accordance with the purpose of the present invention, according to another aspect, in an apparatus for performing a combination service with at least one or more terminals, a terminal can comprise a storage unit for storing at least terminal capability version and terminal capability information of a counterpart terminal, and a processor for sending a terminal capability version the terminal itself to the counterpart terminal when connecting the service and comparing a terminal capability version of the counterpart terminal, which is received from the counterpart terminal, with a stored terminal capability version of the counterpart terminal to selectively perform a terminal capability information exchange procedure and a service connection setup procedure.

According to still another aspect of the present invention, in a method for simultaneously performing first and second services among two or more terminals, a method for performing a combination service can comprise: sending a call setup message for the first service which includes a first capability version from an originating terminal to a receiving (terminating) terminal; receiving, by the originating terminal, a connection response message including a second capability version from the receiving terminal; and sending a session connection request message for the second service from the originating terminal to the receiving terminal when it is confirmed that the received second capability version is equal to a stored capability version of the receiving terminal.

According to another aspect, the present invention provides a terminal capable of providing a circuit switched (CS) service, a session initiation protocol (SIP)-based service, or a CSI service which is a combination of the CS service and an IP multimedia subsystem (IMS), the terminal comprising: a controller to generate a terminal capability version based on at least terminal capability information of the terminal, and to transmit the terminal capability version to at least one target terminal, wherein the terminal capability version identifies a version of capabilities of the terminal.

According to another aspect, the present invention provides a terminal for providing a circuit switched (CS) service, a session initiation protocol (SIP)-based service, or a CSI service which is a combination of the CS service and an IP multimedia subsystem (IMS), the terminal comprising: a controller to transmit a terminal capability version of the terminal to at least one target terminal and to receive a terminal capability version of the at least one target terminal, during an IM session set-up or during a CS call set-up, wherein the terminal capability version identifies a version of capabilities of the corresponding terminal.

According to another aspect, the present invention provides a terminal capable of providing a circuit switched (CS) service, a session initiation protocol (SIP)-based service, or a CSI service which is a combination of the CS service and an IP multimedia subsystem (IMS), the terminal comprising: a controller to receive a terminal capability version of at least one target terminal, to compare the received terminal capability version with a previously stored terminal capability version of the at least one target terminal, and to determine whether to request for terminal capability information of the at least one target terminal based on the comparison result, wherein the terminal capability version identifies a version of capabilities of the at least one target terminal.

According to another aspect, the present invention provides a system capable of providing a circuit switches (CS) service, a session initiation protocol (SIP)-based service, or a CSI service which is a combination of the CS service and an IP multimedia subsystem (IMS), the system comprising: a first terminal and a second terminal to exchange terminal capability versions thereof to each other during a service setup, each terminal capability version identifying a version of capabilities of the corresponding terminal.

According to another aspect, the present invention provides a method for providing a circuit switched (CS) service, a session initiation protocol (SIP)-based service, or a CSI service which is a combination of the CS service and an IP multimedia subsystem (IMS), the method comprising: generating, by a terminal, a terminal capability version based on at least terminal capability information of the terminal; and transmitting, by the terminal, the generated terminal capability version to at least one target terminal, wherein the terminal capability version identifies a version of capabilities of the terminal.

According to another aspect, the present invention provides a method for providing a circuit switched (CS) service, a session initiation protocol (SIP)-based service, or a CSI service which is a combination of the CS service and an IP multimedia subsystem (IMS), the method comprising: transmitting, by a terminal, a terminal capability version of the terminal to at least one target terminal during an IM session set-up or a CS call set-up; and receiving, by the terminal, a terminal capability version of the at least one target terminal from the at least one target terminal during the IM session set-up or the CS call set-up, wherein the terminal capability version identifies a version of capabilities of the corresponding terminal.

According to another aspect, the present invention provides a method for providing a circuit switched (CS) service, a session initiation protocol (SIP)-based service, or a CSI service which is a combination of the CS service and an IP multimedia subsystem (IMS), the method comprising: receiving, by a terminal, a terminal capability version of at least one target terminal; comparing, by the terminal, the received terminal capability version with a previously stored terminal capability version of the at least one target terminal; and determining, by the terminal, whether to request for terminal capability information of the at least one target terminal based on the comparison result, wherein the terminal capability version identifies a version of capabilities of the at least one target terminal.

According to another aspect, the present invention provides a method for providing a circuit switched (CS) service, a session initiation protocol (SIP)-based service, or a CSI service which is a combination of the CS service and an IP multimedia subsystem (IMS), the method comprising: exchanging, by first and second terminals, a terminal capability version of the first terminal and a terminal capability version of the second terminal to each other during a service setup, each terminal capability version identifying a version of capabilities of the corresponding terminal.

According to another aspect, the present invention provides a method for providing a circuit switched (CS) service, a session initiation protocol (SIP)-based service, or a CSI service which is a combination of the CS service and an IP multimedia subsystem (IMS), the method comprising: storing, in a first terminal during a previous CSI service, a public user ID of a second terminal, terminal capability information of the second terminal, and a terminal capability version of the second terminal, wherein the terminal capability version of the second terminal identifies a version of capabilities of the second terminal; storing, in the second terminal during a previous CSI service, a public user ID of the first terminal, terminal capability information of the first terminal, and a terminal capability version of the first terminal, wherein the terminal capability version of the first terminal identifies a version of capabilities of the first terminal; updating the terminal capability information of the first terminal if the first terminal's capability information is dynamically changed; generating, by the first terminal, a new terminal capability version of the first terminal based on at least the updated terminal capability information of the first terminal; transmitting an INVITE message for an IMS session setup from the first terminal to the second terminal, the INVITE message including the new terminal capability version of the first terminal; comparing, by the second terminal, the received terminal capability version of the first terminal with the stored terminal capability version of the first terminal; and selectively performing, by the second terminal, a terminal capability information request procedure based on the comparison result.

According to another aspect, the present invention provides a method for providing a circuit switched (CS) service, a session initiation protocol (SIP)-based service, or a CSI service which is a combination of the CS service and an IP multimedia subsystem (IMS), the method comprising: storing, in a first terminal during a previous CSI service, a public user ID of a second terminal, terminal capability information of the second terminal, and a terminal capability version of the second terminal, wherein the terminal capability version of the second terminal identifies a version of capabilities of the second terminal; storing, in the second terminal during a previous CSI service, a public user ID of the first terminal, terminal capability information of the first terminal, and a terminal capability version of the first terminal, wherein the terminal capability version of the first terminal identifies a version of capabilities of the first terminal; updating the terminal capability information of the first terminal if the first terminal's capability information is dynamically changed; generating, by the first terminal, a new terminal capability version of the first terminal based on at least the updated terminal capability information of the first terminal; transmitting a call setup message for a CS call setup of a current CSI service from the first terminal to the second terminal; transmitting a call connect message from the second terminal to the first terminal in response to the call setup message, the call connect message including a current terminal capability version of the second terminal; selectively performing, by the first terminal, a terminal capability information request procedure based on a comparison of the terminal capability version of the second terminal included in the received call connect message with the stored terminal capability version of the second terminal; transmitting an INVITE message from the first terminal to the second terminal, wherein the new terminal capability version of the first terminal is included in the transmitted INVITE message and/or the transmitted call setup message; and selectively performing, by the second terminal, a terminal capability information request procedure based on a comparison of the terminal capability version of the first terminal included in the received call connect message and/or the INVITE message with the stored terminal capability version of the first terminal.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 4 is a diagram illustrating different examples of a method of generating a unique terminal capability version which correspond to current terminal capability information according to the present invention;

DETAILED DESCRIPTION OF THE PREFERRED EMBODIMENTS

Figure 1:
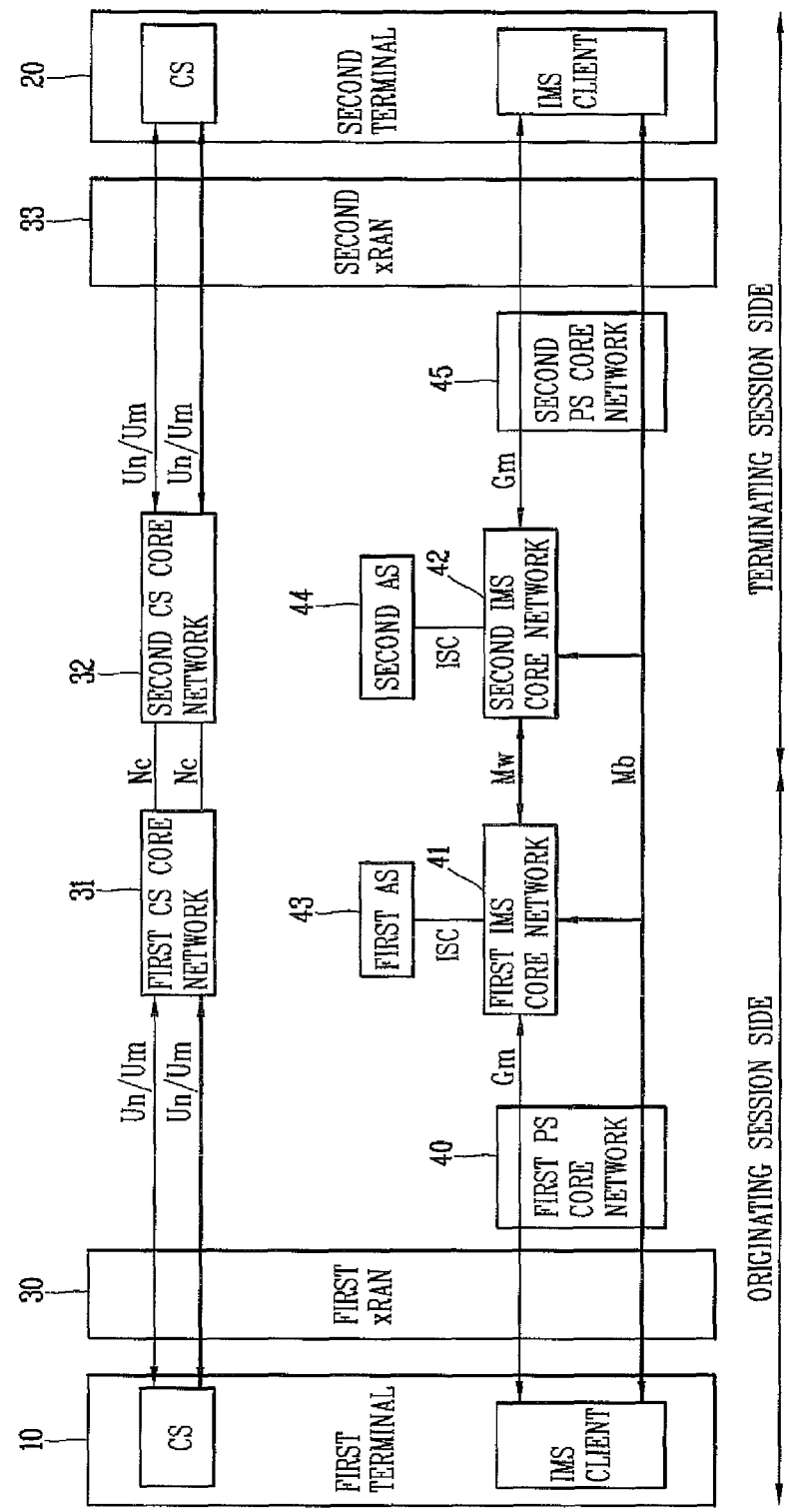
FIG. 1 is a diagram illustrating a network construction for providing a general combination service between first and second terminals.

Description will now be given in detail of the present invention, with reference to the accompanying drawings.

Explanations will be given for a terminal, method and system for performing a combination service using a terminal capability version according to the preferred embodiments of the present invention with reference to the attached drawings hereafter.

In the present disclosure of the present invention, the term "capability version" of a terminal (or terminal capability information) is version information that identifies the version of the capabilities (capability information) of the terminal. For instance, a terminal capability version is a unique value that identifies the current version (set) of capabilities that the terminal has.

In the present invention, at least the current capability information of a terminal is used to generate a unique terminal capability version. Upon setting a combination service connection between at least two terminals, the terminals can send their capability versions to the other terminals using a SIP signaling message, or send their capability versions to the other terminals when sending current radio capability environment information during a call set-up.

Accordingly, a first terminal compares the pre-stored capability version of a second terminal with a currently received capability version of the second terminal to determine whether the terminal capability information of the second terminal has been updated, and thereby selectively performs a terminal capability information exchange procedure and a service connection setup procedure. For instance, if the comparison of the capability versions indicates that the terminal capability information of the second terminal has changed, then the first terminal performs the terminal capability information request/exchange procedure to obtain the updated terminal capability information of the second terminal from the second terminal. As a result, the first terminal requests for the terminal capability information of the second terminal only when the first terminal determines the terminal capability information of the second terminal has been changed/updated.

Now, the terminal capability information of each terminal will be explained according to the present invention. The terminal capability information (i.e., capability set or set of capabilities) may include at least one or more of the following items:

Screen capabilities, colors, resolution, sizes and the like
   Memory/storage capacity (for downloading video, music, email attachment, etc.)
   Capability to stream/download video and still images
   Codec types (EFR, AMR, MPEG4, H.264, MPS, etc.)
   Device software/firmware release/version.
   Calendar storage capacity
   Contacts storage capacity
   Notes storage capacity
   Operating System of devices (terminals)
   Browser types (WAP 1.2/2.0, HTML, etc.)
   MExE classmark (mobile execution environment)
   USIM application toolket capabilities (release/version)
   Data rate capability
   SIP call control protocol
   Number of simultaneous PDP contexts supported
   Number of APNs supported In the present invention, such terminal capability information of a terminal alone or with some other information is used to generate a unique terminal capability version. For instance, the terminal can use only its terminal capability information to generate the terminal capability version. As an alternative, the terminal can use its terminal capability information, a private user Identity (ID) associated with the terminal, and a public user ID associated with the terminal, to generate the unique terminal capability version. Hence, if one user has several terminals and the several terminals use the same public user ID, it is possible to correctly distinguish the terminal capability information of each terminal using the same public user ID based upon the corresponding terminal capability version of each terminal. As another alternative, the terminal can use its terminal capability information and a public user ID associated with the terminal to generate the unique terminal capability version.

According to the present invention, in order to generate the unique terminal capability version based upon at least the terminal capability information, the terminal can use a hash function or may use other methods.

Furthermore, the terminal capability version can have a unique value of one byte (or some other data size) according to the terminal capability information (i.e., the capability sets). When the terminal capability version has the value of one byte, 256 different terminal capability information can be represented. The number of terminal capability versions to be represented can be enlarged or decreased according to the features of an application program.

The unique values of the terminal capability versions can be indicated in a bit form or a digit form. The terminal capability version can also have a unique value in a UCV-XX (UE Capability Version-XX) form. Here, the "XX" may be a 2-digit hexadecimal number as shown in Table 1 below. The "XX" may have values belonging to a range from "00" to a hexadecimal number "FF". The terminal capability version having the UCV-XX form may be generated by a CSI user agent (CUV) based upon the terminal capability information. The hexadecimal number "XX" is coded in the terminal (i.e., UE) capability version information element.

TABLE 1

| 8 | 7 | 6 | 5 | 4 | 3 | 2 | 1 | |
|---|---|---|---|---|---|---|---|---|
| UE capability version IEI (information element identifier) | | | | | | | | octet 1 |
| UE capability version digit 2 | | | | UE capability version digit 1 | | | | octet 2 |

Figure 3:
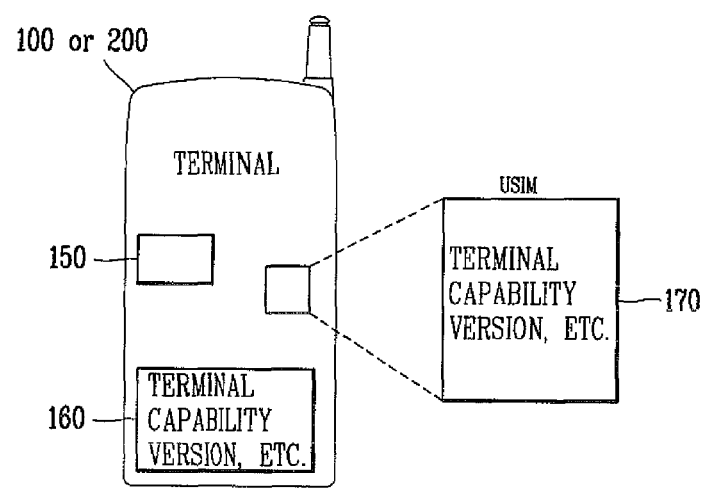
FIG. 3 is a diagram illustrating a terminal equipped with a storage unit for storing a terminal capability version according to current terminal capability information according to an embodiment of the present invention.

Each terminal (UE) stores its own terminal capability version according to at least its terminal capability information in a storage unit associated with that terminal, and also stores the terminal capability version(s) of other terminals. FIG. 3 illustrates a terminal 100 or 200 equipped with such a storage unit for storing the terminal capability version(s) according to the present invention. The storage unit can be a memory or cache 160, or a Universal Subscriber Identity Module (USIM) 170. Both the internal storage and/or the external/detachable storage of the terminal can store therein the current capability version of the terminal as well as the capability version(s) of other terminals. Each terminal also includes a controller/processor 150 and other components known in the related art terminals or the like such a user input unit, a display unit, an audio unit, a network interface, etc.

The terminal capability information of each terminal, on the other hand, can be updated dynamically. The terminal capability information of the terminal can be updated, for example, when several devices (e.g., a camera, etc.) were dynamically attached to the terminal or detached therefrom, when the terminal registered in an IP Multimedia Subsystem (IMS) service or de-registered therefrom, when the terminal uses a downloading service to download a new codec, or the like. The present invention in fact can cover any situation in which the terminal changes/updates its capabilities (capability information). In all such situations, the terminal generates a unique terminal capability version each time the terminal capability information of the terminal is updated (changed), and the generated new terminal capability version is stored in the storage unit of the terminal as the current terminal capability version of the terminal.

FIG. 4 illustrates different examples of a method of generating a unique terminal capability version based on at least the current terminal capability information according to the present invention. This method can be performed by the terminal, e.g., the terminal 100, 200 of FIGS. 3 and 5-7.

As shown in FIG. 4, a known hash function can be used to generate a unique terminal capability version for each terminal. For using the hash function, the terminal inputs only the updated terminal capability information into the hash function to generate a unique terminal capability version. As an alternative, the terminal can input a private user ID and/or a public user ID into the hash function together with the updated terminal capability information so as to generate a unique terminal capability version. For instance, a unique terminal capability version can be generated using a hash or other encryption function by the following (a) or (b): (a) the terminal capability information of the terminal, a public user ID associated with the terminal, and a private user ID associated with the terminal; or (b) the terminal capability information of the terminal and a public user ID associated with the terminal.

In the first example of FIG. 4, if the current terminal capability information (i.e., first terminal capability information) of the terminal is a capability set including screen capabilities with 256 colors and a 640×486 resolution, a 256 MB memory, an Enhanced Full Rate (EFR), an Adaptive Multi-Rate (AMR), Motion Picture Experts Group 4 (MPEG4), a codec type including H.264, and a WAP 1.2 browser type, then the terminal inputs the first terminal capability information into a hash function to generate a first terminal capability version having a unique value. As illustrated in FIG. 4, the first terminal capability version may be '0100 1000', for example.

In the second example of FIG. 4, when a camera is attached to the terminal and thus the capability of the terminal is changed, the terminal inputs its current terminal capability information (i.e., second terminal capability information) having a camera function added thereto into a hash function to generate a second terminal capability version having a unique value. Here, the generated second terminal capability version may be '1011 1001', for example.

In the third example of FIG. 4, when the browser type of the terminal is updated to a WAP 2.0, the terminal uses its current terminal capability information (i.e., third terminal capability information) of which browser type has been updated to generate a third terminal capability version having a unique value. The third terminal capability version may be '0101 1000', for example.

As aforementioned, whenever the terminal capability information of the terminal is dynamically changed, the terminal changes its terminal capability version to have a new unique value based on at least the changed terminal capability information. Hence, it is possible to easily confirm whether or not the terminal capability information of the terminal has been changed based upon whether or not the terminal capability version of the terminal has been changed.

In the present invention, upon exchanging the terminal capability information of the terminal using a Session Initiation Protocol (SIP) signaling message (e.g., an OPTIONS message, an INVITE message, etc.) or upon exchanging current radio capability environment information during a call setup (e.g., a call setup message), each terminal sends its terminal capability version to other terminal(s). The terminal capability versions of the other terminal(s) exchanged are stored in each terminal together with the exchanged terminal capability information and the public user ID associated with the corresponding terminal.

Afterwards, upon setting a service connection for a combination service including, but not limited to, the CSI, if the terminal capability version value of a terminal B stored in a terminal A is different from the terminal capability version value of the terminal B currently received by the terminal A according to the comparison therebetween, then the terminal A can notify the terminal B that the stored terminal capability version of the terminal B needs to be updated and also request for the current capability information of the terminal B. The terminal capability version value of the terminal B as stored in the terminal A may be different from the terminal capability version value of the terminal B currently received by the terminal A in cases where a storage unit (e.g., an SIM or USIM) of the terminal A has been replaced, the terminal capability information of the terminal B has dynamically been changed, etc.

On the other hand, as a method for maintaining a consistency of the storage unit of the terminal for storing the terminal capability information, the present invention provides a method in which when the terminal capability information of the terminal has dynamically changed, the changed contents are sent to another terminal with the public user ID stored in the storage unit of the terminal using a method such as LBS.

Figure 5:
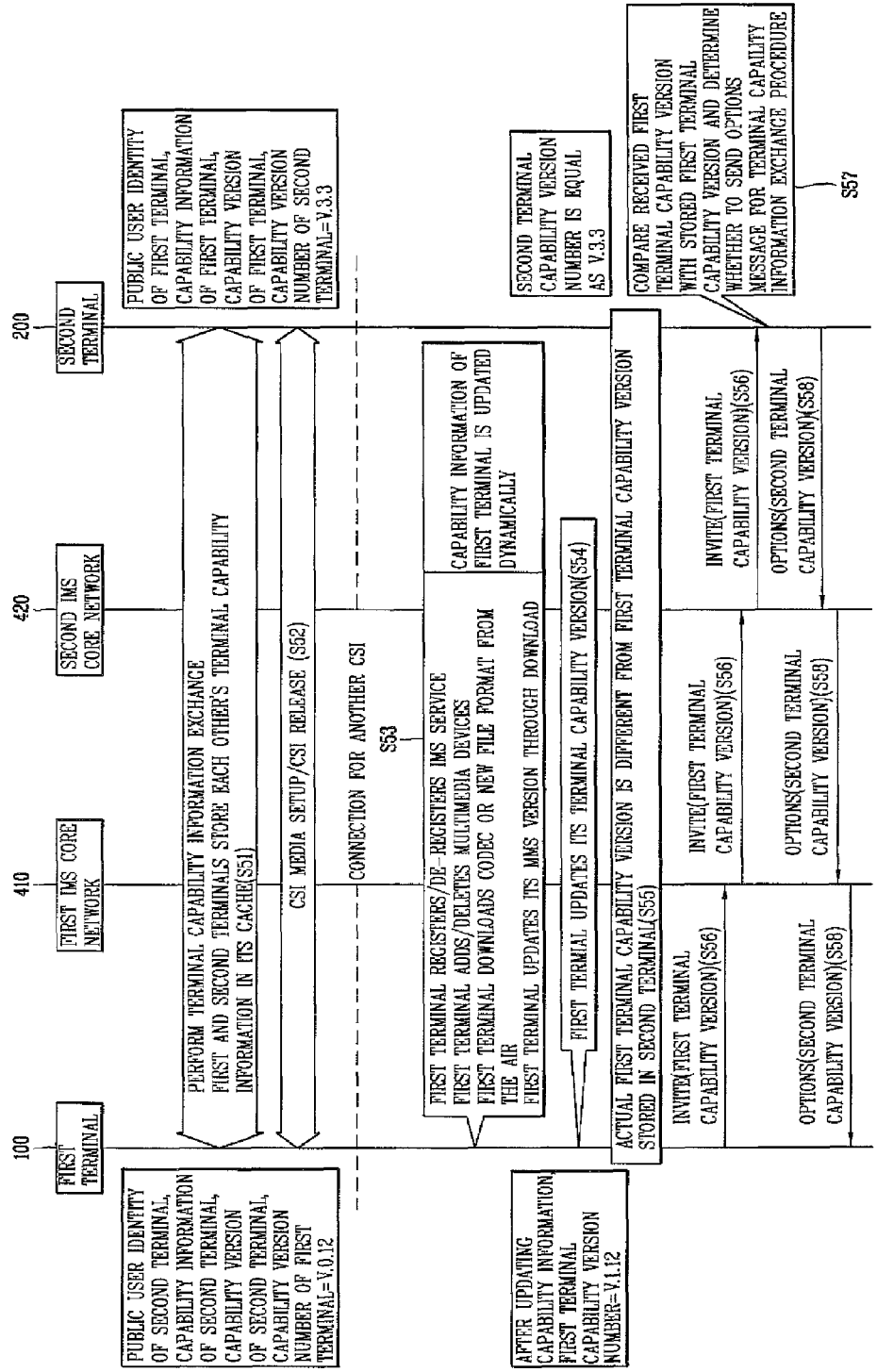
FIG. 5 is a diagram illustrating a method for performing a combination service using terminal capability versions according to a first embodiment of the present invention.

FIG. 5 illustrates a method for performing a combination service using a terminal capability version according to a first embodiment of the present invention. The method of FIG. 5 includes the method of generating a unique terminal capability version as discussed above. The method of FIG. 5 can be implemented in the system and device of FIGS. 1 and 3 or in other similar or suitable device/system. The processes to be performed by the terminal 100 or 200 can be performed and/or controlled by the controller 150 of the terminal 100 or 200.

As illustrated in FIG. 5, in order to perform the combination service including at least a first service and a second service, a system for performing a combination service using a terminal capability version can include first and second terminals 100 and 200 which exchange their terminal capability versions to each other when connecting for the first service. Each terminal compares the received terminal capability version of the other terminal with a stored terminal capability version of the other terminal, and, if the two terminal capability versions are not equal, requests updated terminal capability information from the terminal for reception.

The system may further include a first service network for providing the first service to the first and second terminals 100 and 200, and a second service network for providing the second service to the first and second terminals 100 and 200. When the first service is a SIP-based service such as an IMS service, the first service network may include a first IMS core network 410 for providing the IMS service to the first terminal 100, and a second IMS core network 420 for providing the IMS service to the second terminal 200. When the second service is a CS service, the second service network may include a first CS core network (e.g., 31 in FIG. 1) for providing the CS service to the first terminal 100, and a second core network (e.g., 32 in FIG. 1) for providing the CS service to the second terminal 200. The system can also include other components such as first and second PS core networks, first and second xRANs, first and second ASs, etc. All the components of the system are operatively coupled and/or configured.

The storage unit 160, 170 of each terminal 100, 200 can store therein its own terminal capability version and terminal capability information, the terminal capability version and terminal capability information of other terminal(s) (e.g., obtained from a previous service connection with the other terminal(s)), and its own public user ID and a public user ID of the other parties. The controller/processor 150 of each terminal 100, 200 sends its terminal capability version to another party/terminal when connecting for the first service, compares the terminal capability version of the another party received from the another party with the terminal capability version of the another party stored in the storage unit, and selectively performs a terminal capability exchange procedure and a service connection setup procedure based on the comparison results.

With reference to FIG. 5, the method for performing the combination service using the terminal capability version according to the first embodiment of the present invention will now be explained. FIG. 5 illustrates an example of the method in which an IMS session is set first and thereafter a CS call is set when setting a combination service connection, namely, the CSI connection. This method is also applicable when setting an IMS session only, i.e., no CS call is set after the IMS session is set.

As shown in FIG. 5, the first terminal 100 and the second terminal 200 exchange their terminal capability information with each other using a combination service (e.g., a current CSI service connection) and thereafter respectively store the exchanged terminal capability information, e.g., in the cache of the respective terminal. The first and second terminals 100 and 200 respectively store, e.g., in its storage unit, at least a public user ID of the other party (associated with the other terminal), a terminal capability version of the other terminal, and terminal capability information of the other terminal (S51). The terminal capability version of each terminal is calculated as discussed above, e.g., based on at least the capability information of the terminal. The terminal capability information may include a codec to be supportable, a file format, and the like, for example. In addition, each of the first and second terminals 100 and 200 also stores therein its own public user ID, its terminal capability version (value), its terminal capability information, etc. As an example, the current capability versions of the first and second terminals are V.0.12 and V.3.3. at step S51.

Then, the first and second terminals 100 and 200 perform a data exchange and a voice exchange using the current session/connection for the CSI service, and thereafter release the current CSI session/connection between the first and second terminals 100 and 200 (S52). Here, the first terminal 100 can store therein the public user ID of the second terminal 200, the terminal capability version of the second terminal 200, and the terminal capability information of the second terminal 200, all of which have been exchanged during the CSI setup procedure, and also stores therein its terminal capability version. The second terminal 200 can also store such information related to the terminal capability information of the first terminal 100 using the same method. The information stored in the first terminal 100 is used when the first terminal 100 expects to perform another CSI service with the second terminal 200 later.

Afterwards, the terminal capability information of each terminal, e.g., the terminal capability information of the first terminal 100, may be changed due to various reasons. For instance, the terminal capability information of the first terminal 100 may be changed in cases where IMS services (e.g., PoC (Push-to-talk Over Cellular), IM, broadcasting, etc.) were registered or de-registered, multimedia devices (e.g., a camera, etc.) were dynamically attached to the first terminal 100 or detached therefrom, a downloading service was used to modify a new codec or a supportable file format, or a version of a Multimedia Message service (MMS) was updated (S53).

When the terminal capability information of the first terminal 100 is changed, the first terminal 100 changes its terminal capability version, e.g., based on at least the updated capability information of the first terminal 100 (S54). As a result, the current terminal capability version of the first terminal 100 is now different from the terminal capability version of the first terminal 100 stored in the second terminal 200. For example, since the terminal capability version of the first terminal 100 has been changed from V.0.12 to V.1.12 due to the change of its terminal capability information, the current terminal capability version of the first terminal 100 is now different from the terminal capability version of the terminal 100 (i.e., V.0.12) currently stored in the second terminal 200 (S55).

Thereafter, when the first terminal 100 desires to perform a CSI service with the second terminal 200, the first terminal 100 attempts to a session connection for an IMS service. Here, the first terminal 100 confirms that it already has stored information related to the second terminal 200, and immediately performs an IMS session setup by sending an INVITE message without exchanging terminal capability information therebetween. The INVITE message includes therein the current terminal capability version (i.e., V.1.12) of the first terminal 100. The first terminal 100 can generate the INVITE message with reference to the information of the second terminal 200 stored therein and sends the generated INVITE message to the second terminal 200. The information of the second terminal 200 that is stored in the first terminal 100 may include at least the public use ID and the terminal capability information of the second terminal 200.

The INVITE message is sent from the first terminal 100 to the second terminal 200 via the first IMS core network 410 and the second IMS core network 420 (S56).

The second terminal 200 obtains the terminal capability version of the first terminal 100 included in the received INVITE message. The second terminal 200 compares the received terminal capability version (e.g., V.1.12) of the first terminal 100 with the terminal capability version (e.g., V.0.12) of the first terminal 100 pre-stored in the second terminal 200. The second terminal 200 selects and performs one the terminal capability information exchange procedure and a response sending procedure with respect to the IMS session connection request according to the results of the comparison (S57).

For instance, If the received terminal capability version of the first terminal 100 is equal to the pre-stored terminal capability version of the first terminal 100, the second terminal 200 determines that the current terminal capability information of the first terminal 100 has not been changed after performing the previous CSI service, and thus sends a 200 OK message in response to the INVITE message. However, if the received terminal capability version of the first terminal 100 is different from the pre-stored terminal capability version of the first terminal 100, the second terminal 200 determines that the current terminal capability information of the first terminal 100 has been changed after performing the previous CSI service, and thus performs the terminal capability information exchange procedure to obtain the current capability information of the first terminal 100. That is, the second terminal 200 sends an OPTIONS request message (SIP message) to the first terminal 100 to request the changed terminal capability information of the first terminal 100. The OPTIONS request message may include the current terminal capability version of the second terminal 200. The OPTIONS request message is sent from the second terminal 200 to the first terminal 100 via the first and second IMS core networks 410 and 420 (S58).

The first terminal 100 having received the OPTIONS request message sends its terminal capability information to the second terminal 200. The second terminal 200 then stores the newly changed terminal capability information of the first terminal 100. Accordingly, each of the first and second terminals 100 and 200 obtains and stores the current terminal capability information and the current terminal capability version of the other terminal.

Afterwards, if desired the first terminal 100 and the second terminal 200 can perform a CS call setup procedure through first and second CS core networks to provide the CSI service. The CS call setup procedure for the CSI service is known.

Accordingly, each time the terminal capability information of a terminal is changed, the terminal capability version can be maintained with a unique value, and then sent to one or more parties, whereby it is possible to determine whether or not the terminal capability information of each terminal has been changed and then the terminal capability information can be requested if the terminal capability information has changed based on the determination, thereby stably using the storage unit of each terminal. The present invention thus provides an effective and efficient system and method for exchanging terminal capability information for a combination service such as a CSI.

Figure 6:
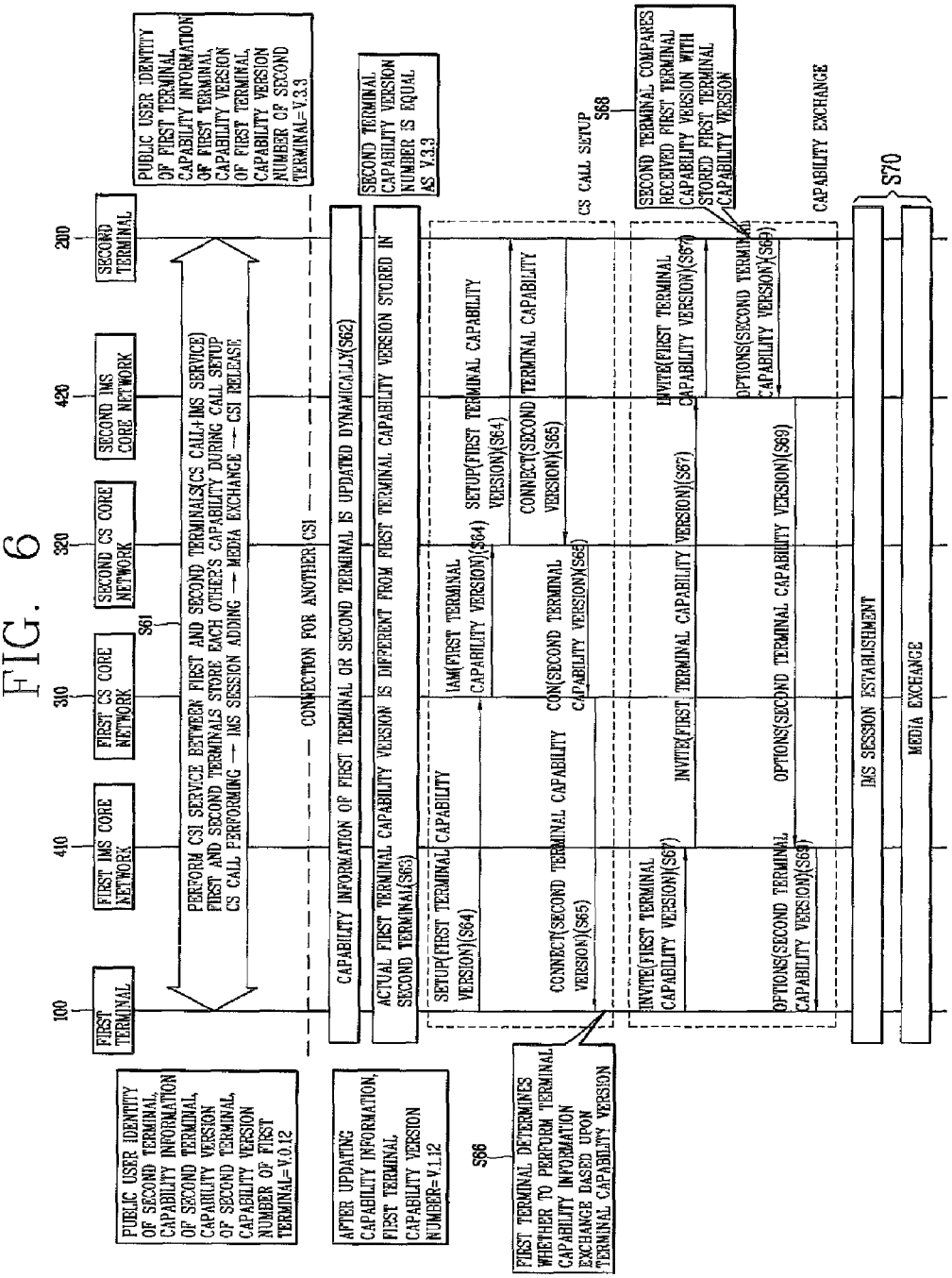
FIG. 6 is a diagram illustrating a method for performing a combination service using terminal capability versions according to a second embodiment of the present invention.

FIG. 6 illustrates a method for performing a combination service using a terminal capability version according to a second embodiment of the present invention. The method of FIG. 6 includes the method of generating a unique terminal capability version as discussed above. The method of FIG. 6 can be implemented in the system and device of FIGS. 1 and 3 or in other similar or suitable device/system. The processes to be performed by the terminal 100 or 200 can be performed and/or controlled by the controller 150 of the terminal 100 or 200.

As illustrated in FIG. 6, a system for performing the combination service using the terminal capability version according to the present invention may include the first and second terminals 100 and 200, the first and second IMS core networks 410 and 420 and the first and second CS core networks 310 and 320. FIG. 6 illustrates a method for performing a combination service in which when the combination service is the CSI service, the CS call is first set and thereafter the IMS session is set.

Step S61 is performed using the same method used for S51 and S52 of FIG. 5. Upon completing the CSI service between the first terminal 100 and the second terminal 200, the public user ID, the terminal capability information, and the terminal capability version of each terminal are stored in the other one of the first and second 100 and 200 (S61). That is, steps S61 is the same or similar to steps S51 and S52 of FIG. 5.

As an example, it is assumed that information as follows is stored in the first terminal 100:

Second terminal; bobs@lge.com; text-audio-video-mpegtypeofcodec-etc; V.3.3 wherein the public user ID of the second terminal 200, e.g., URI, is bobs@lge.com, supportable terminal capability information of the second terminal 200 indicates text, audio, video, mpeg and various codecs, and the current terminal capability version of the second terminal 200 is V.3.3.

Thereafter, each of the first and second terminals 100 and 200 can dynamically change their terminal capability information, e.g., in cases of registering and de-registering of the IMS service, attaching and detaching of multimedia devices, etc. As an example, an explanation will be given below for a case where the terminal capability information of the first terminal 100 has been changed.

When the terminal capability information of the first terminal 100 is changed, the first terminal 100 uses at least the changed terminal capability information (with or without additional information such as public user ID and/or private user ID) to generate a new terminal capability version having a unique value (S62 and S63). As an example, the previous terminal capability version of the first terminal 100 was V.0.12, whereas the newly generated (changed) terminal capability version is V.1.12.

Afterwards, when the first terminal 100 wants to firstly set a CS call to perform a CSI service with the second terminal 200, the first terminal 100 sends a CS call setup message (e.g., a SETUP message) to the second terminal 200 (S64). The CS call setup message can include at least the terminal capability version of the first terminal 100. For example, the current terminal capability version (value) of the first terminal 100, which is V.1.12, is included in the call setup message. The call setup message is sent from the first terminal 100 to the second terminal 200 via the first and second CS core networks 310 and 320.

The second terminal 200 then sends a connection message CONNCECT to the first terminal 100 in response to the call setup message (S65). The connection message CONNECT may include at least the terminal capability version (e.g., V.3.3) of the second terminal 200. The connection message CONNECT can be sent from the second terminal 200 to the first terminal 100 via the first and second CS core networks 310 and 320.

After completing the CS call setup, in order to set an IMS session for the CSI service, the first terminal 100 compares the pre-stored terminal capability version (e.g., V.3.3) of the second terminal 200 with the terminal capability version (e.g., V.3.3) of the second terminal 200 received when setting the CS call (S66). According to the results of the comparison, the first terminal 100 selects and performs either the terminal capability information exchange procedure or immediately the IMS session setup procedure.

For instance, at step S66, if the previously-stored terminal capability version of the second terminal 200 is different from the received terminal capability version of the second terminal 200, the first terminal 100 determines that the terminal capability information of the second terminal 200 has been changed since performing a previous CSI service. Thus the first terminal 100 performs the terminal capability information exchange/transmission procedure, wherein the first terminal 100 sends a SIP's OPTIONS request message to the second terminal 200 in order to request and receive the changed terminal capability information of the second terminal 200 from the second terminal 200 (not shown in FIG. 6, but similar to the OPTIONS procedure of FIG. 2).

However, at step S66, if the pre-stored terminal capability version (e.g., V.3.3) of the second terminal 200 is equal to the received terminal capability version (e.g., V.3.3) of the second terminal 200 (which is the case in the present example), the first terminal 100 determines that the current terminal capability information of the second terminal 200 is equal to the terminal capability information of the second terminal 200 at the time of performing the previous CSI service. That is, there is no change in the terminal capability information of the second terminal 200. Hence, the first terminal 100 does not send the OPTIONS request message for the terminal capability information exchange to the second terminal 200, but instead sends an INVITE message to the second terminal 100 for requesting an IMS session setup thereto (S67). Here, the INVITE message may include at least the terminal capability version of the first terminal 100. Here, the terminal capability version of the first terminal 100 is V.1.12, for example. The INVITE message is sent to the second terminal 200 via the first and second IMS core networks 410 and 420.

The second terminal 200 then compares the terminal capability version of the first terminal 100 having received using the INVITE message with the terminal capability version of the first terminal 100 which has been previously stored therein (S68). According to the results of the comparison, the second terminal 200 selects and performs one of the terminal capability information exchange procedure and the IMS session connecting procedure. For instance, the second terminal 200 transmits either a terminal capability information request of the first terminal 100 or response with respect to the IMS session connecting request, to the first terminal 100.

Figure 2:
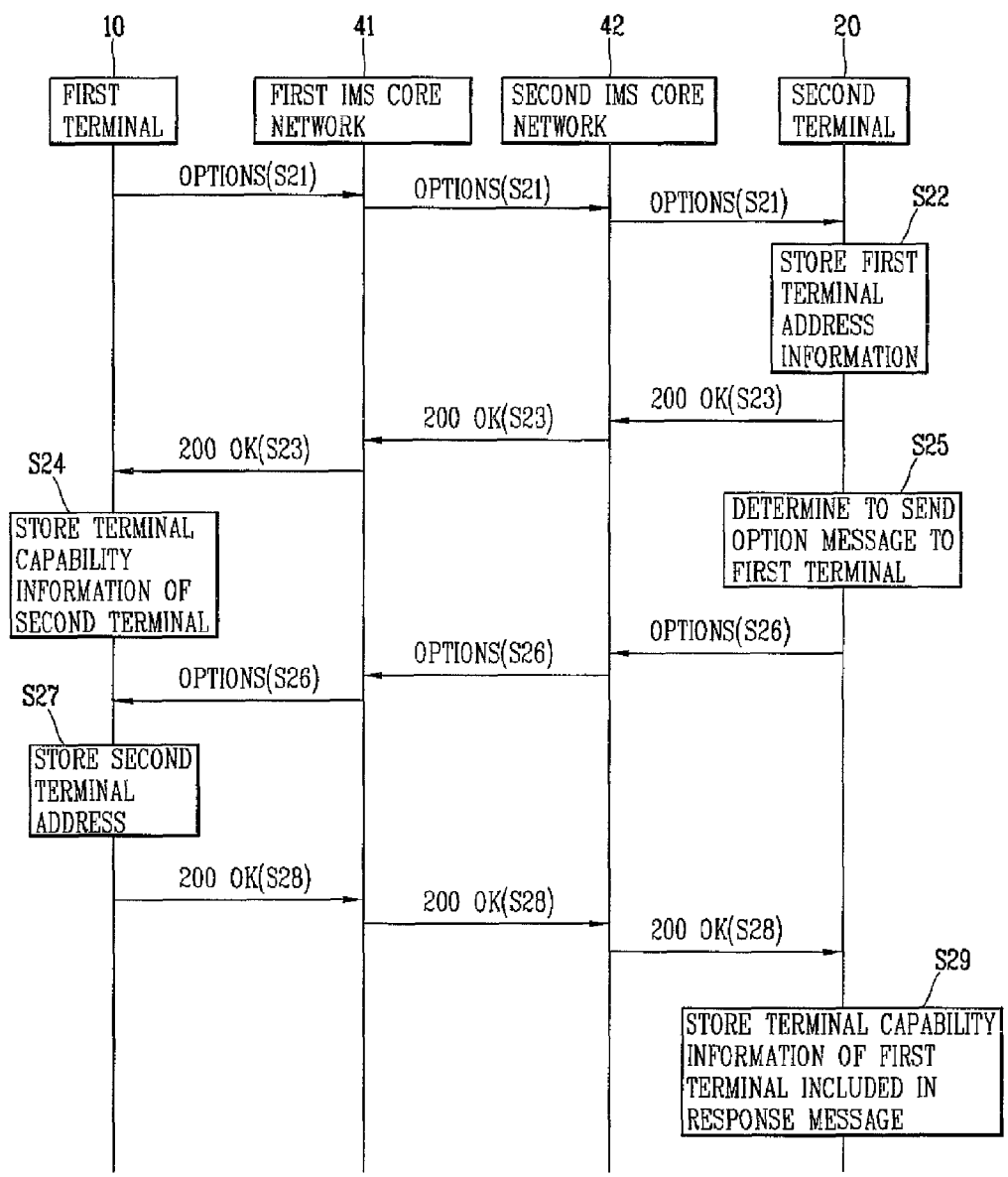
FIG. 2 is a diagram illustrating a general method for exchanging terminal capability information between the first and second terminals of FIG. 1.

That is, at step S68, if the received terminal capability version of the first terminal 100 is equal to the stored terminal capability version of the first terminal 100, the second terminal 200 determines the current terminal capability information of the first terminal 100 is equal to the terminal capability information from a previous CSI service, and thus sends a 200 OK message to the first terminal 100 in response to the INVITE message (not shown in FIG. 6, but similar to what is shown in FIG. 2).

However, at step S68, if the received terminal capability version of the first terminal 100 is different from the stored terminal capability version of the first terminal 100, for example, if the received terminal capability version is V.1.12 and the stored terminal capability version is V.0.12, the second terminal 200 determines that the current terminal capability information of the first terminal 100 is different from the terminal capability information from the previous CSI service. In other words, the second terminal 200 determines that the terminal capability information of the first terminal 100 has been changed. The second terminal 200 accordingly sends an OPTIONS request message to the first terminal 100 to thus request the changed terminal capability information of the first terminal 100 (S69). The OPTIONS request message here may include the terminal capability version of the second terminal 200. The first terminal 100 having received the OPTIONS request message then sends the changed terminal capability information thereof to the second terminal 200 using an OPTIONS response message, so that the second terminal 200 can obtain current capability information of the first terminal 100 for the CSI service.

Accordingly, the second terminal 200 stores the changed terminal capability information of the first terminal 100 therein as well as the capability version of the first terminal 100 that corresponds with the changed terminal capability information of the first terminal 100. Therefore, the present invention maintains consistency between the current terminal capability information of the first terminal 100 and the terminal capability information of the first terminal 100 stored in the second terminal 200.

Afterwards, the IMS session is set between the first and second terminals 100 and 200 through a known IMS session setup procedure and actual data (media) are exchanged therebetween (S70).

At step S64, if the CS call setup message to the second terminal 200 includes the terminal capability version of the first terminal 100, then the second terminal 200 can compare the received capability version with the stored capability version of the first terminal 100 and can perform the capability information exchange procedure (if the versions are different) or the IMS session setup procedure directly (if the versions are the same).

Accordingly, each of the first and second terminals 100 and 200 uses a unique terminal capability version of the other terminal that has been generated based upon at least the current terminal capability information of the other terminal. This prevents the problematic inconsistency between the received terminal capability information and the pre-stored terminal capability information, and also simplifies a signaling procedure for the combination service connection. Furthermore, since the terminal capability information exchange/transmission procedure is performed only when the received capability version value is different from the pre-stored capability version of the corresponding terminal, the network load is reduced and the CSI service procedures are made effective and efficient.

Furthermore, one user generally has a plurality of terminals and the terminals generally use the same public user ID. Here, in a general combination service system, each terminal stores terminal capability information based upon the public user ID (e.g., a URI), and accordingly it may be difficult to distinguish each terminal capability information of the plurality of terminals using the same public user ID (e.g., the URI), thereby resulting in some inconsistency in the terminal capability information. However, the present invention can generate a unique terminal capability version based on at least a public user ID of a terminal, a private user ID of the terminal and terminal capability information of the terminal, or based on at least the public user ID and terminal capability information of the terminal, for example, by using the hash function or other encryption/encoding technique. Accordingly, even in cases where one user has a plurality of terminals and uses the same URI for all the terminals, it is possible to generate different terminal capability versions having unique values based upon the terminal capability information of each terminal.

Therefore, according to the present invention, each terminal has a unique terminal capability version based upon the current terminal capability information of the terminal, whereby it is possible to distinguish the plurality of terminals and each terminal capability information of the plurality of terminals.

In addition, in the related art, since an originating side confirmed pre-stored information of a receiving side, determined whether the terminal capability information was changed (updated), and then performed the terminal capability information exchange procedure, when the originating side user previously set a call forward function toward a certain terminal among the plurality of terminals belonging to the user, the terminal capability information exchange procedure was unnecessarily performed.

However, in the present invention, if there is a change in the terminal capability version during a call setup or a session setup, a certain side (i.e., the originating side or the receiving side) having received the terminal capability version of the other side compares the received terminal capability version with a pre-stored terminal capability version to determine whether the terminal capability information has been changed. Accordingly, the related art problem, which may be caused when using an additional service such as a call exchange, can be solved.

Figure 7:
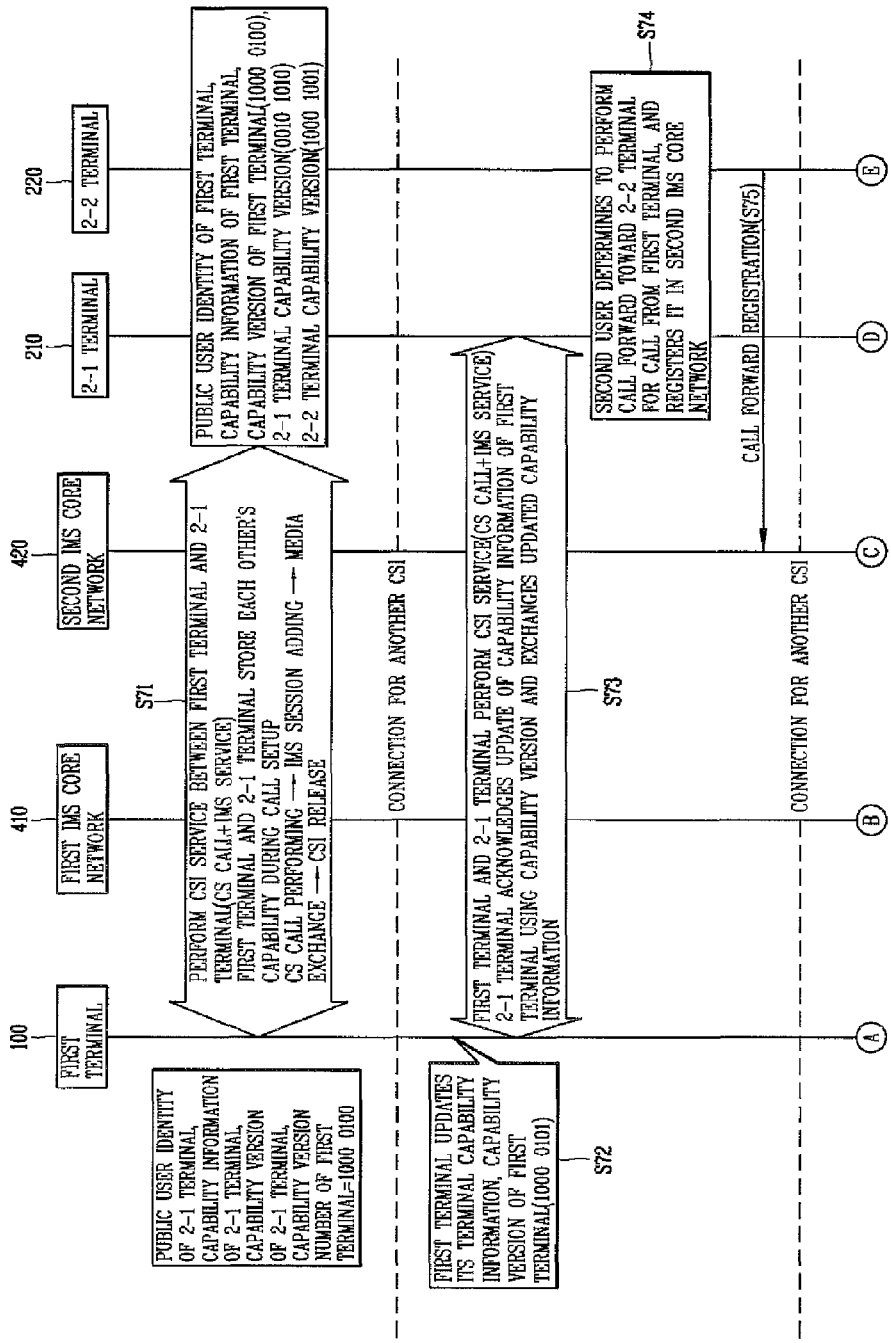
FIGS. 7 and 8 are diagrams illustrating a method for performing a combination service using terminal capability versions according to a third embodiment of the present invention.
Figure 8:
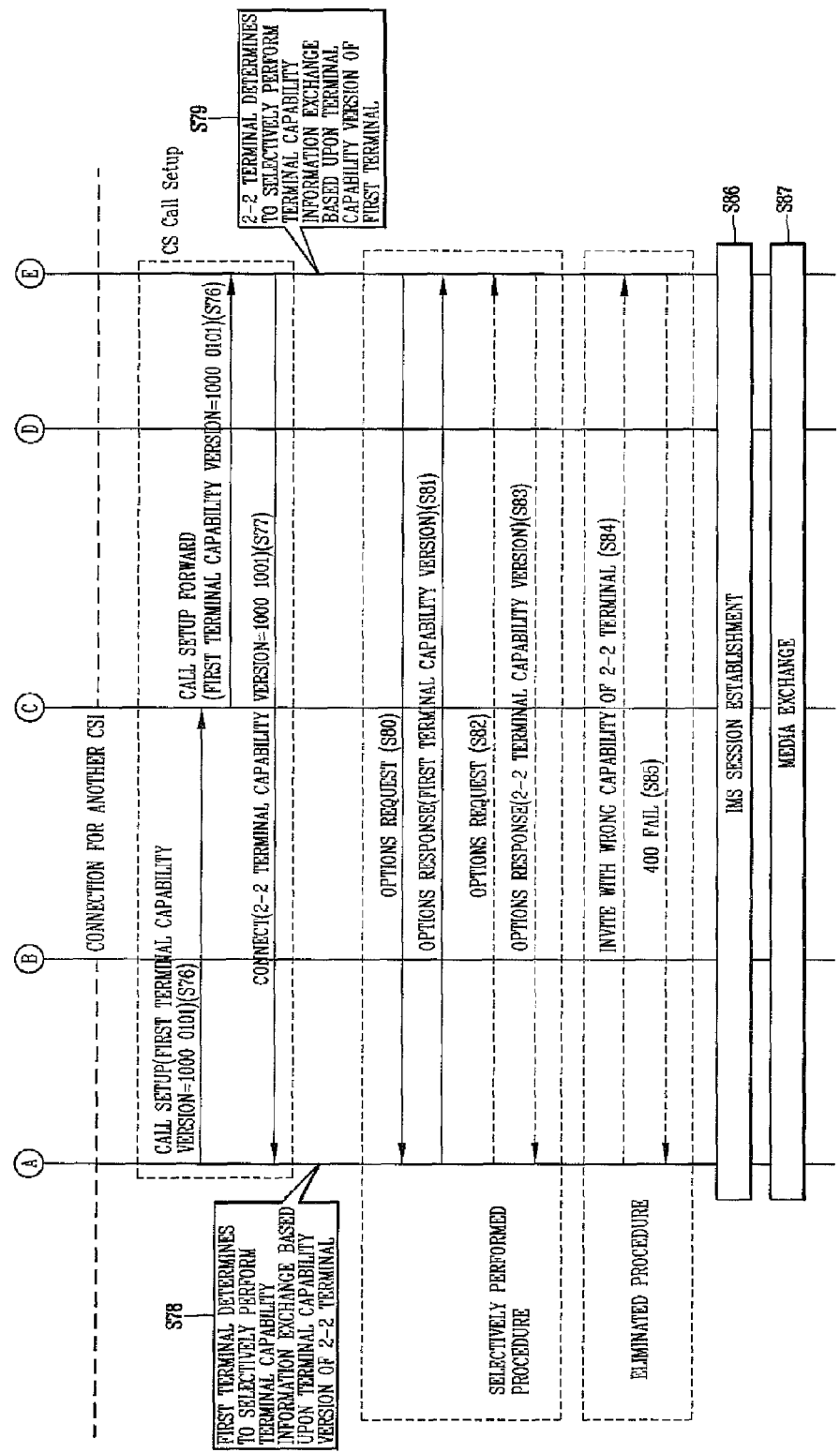

FIGS. 7 and 8 illustrate a method for performing a combination service using a terminal capability version according to a third embodiment of the present invention. As illustrated in FIGS. 7 and 8, the third embodiment addresses a situation when a combination service is performed between at least a first user and a second user, and the second user has a plurality of terminals using the same public use ID associated with the second user. The method of FIGS. 7 and 8 includes the method of generating a unique terminal capability version as discussed above. The method of FIGS. 7 and 8 can be implemented in the system and device of FIGS. 1 and 3 or in other similar or suitable device/system. The processes to be performed by the terminal 100 or 200 can be performed and/or controlled by the controller 150 of the terminal 100 or 200.

As illustrated in FIGS. 7 and 8, in a system for performing the combination service according to the present invention, the first user uses the first terminal 100, and the second user uses a plurality of terminals 200 designated here as a 2-1 terminal 210 and a 2-2 terminal 220 as examples. The 2-1 and 2-2 terminals 210 and the 220 use the same public user ID, for example, a URI. In the method for performing the combination service illustrated in FIGS. 7 and 8, when the combination service is a CSI service, a CS call is first set and thereafter an IMS session is set. Furthermore, in the method of FIGS. 7 and 8, the second user has previously set a call forward function for forwarding incoming calls toward the 2-2 terminal 220. In this example, the terminal capability information of each of the 2-1 terminal 210 and the 2-2 terminal 220 is not changed during CSI services while the first terminal 100 dynamically updates its terminal capability information. Other scenarios are possible and the present invention applies equally thereto.

Assume that the first user's first terminal 100 has previously performed a CSI service with the second user's 2-2 terminal 220, and accordingly a public user ID, terminal capability information and a terminal capability version of the other terminal have already been stored in each of the first terminal 100 and the 2-2 terminal 220.

Afterwards, the first terminal 100 performs a CSI service with the second user's 2-1 terminal 210. Accordingly, the public user ID, the terminal capability information and the terminal capability version of the other terminal, all of which are exchanged during a CSI service connection setup, are stored in each of the first terminal 100 and the 2-1 terminal 210 (S71).

That is, the first terminal 100 stores therein the public user ID, the terminal capability information and the terminal capability version all of which are related to the 2-1 terminal 210, and also stores therein such information related to the 2-2 terminal 220. Here, the terminal capability version of the first terminal 100 is 1000 0100, for example, whereas the capability versions of the terminals 210 and 220 are respectively 0010 1010 and 1000 1001, for example. Since the capability versions of the terminals 210 and 220 can be generated based on the terminal capability information with or without the public user ID and/or private user ID as discussed above, each capability version (value) will be unique.

Afterwards, when the terminal capability information of the first terminal 100 is changed, e.g., due to attaching multimedia devices such as camera thereto or detaching the devices therefrom, the first terminal 100 uses at least its changed terminal capability information to re-generate a unique terminal capability version (S72). Here, the newly generated terminal capability version of the first terminal 100 is 1000 0101, for example.

When the first terminal 100 having the changed terminal capability information desires to perform another CSI service with the 2-1 terminal 210, the 2-1 terminal 210 determines that the current terminal capability information of the first terminal 100 has been changed based upon the changed terminal capability version of the first terminal 100. That is, the terminal 210 compares the received terminal capability version of the first terminal 100 with the previously stored version to make this determination. The 2-1 terminal 210 then requests and receives the changed terminal capability information of the first terminal 100 therefrom, e.g., using the OPTIONS request, etc. (S73).

Thereafter, the second user registers a call forward function in order to forward any calls received at the 2-1 terminal 210 toward the 2-2 terminal 220 (S74 and S75). For instance, the second user (the 2-2 terminal 220) registers the call forward request in the second IMS core network 410, whereby call forward function setting information (information associated with the call forward function) is generated and stored appropriately. In another embodiment, the 2-1 terminal 210 registers the call forward request in the second IMS core network 410, whereby call forward function setting information (information associated with the call forward function) is generated and stored appropriately.

Thereafter, when the first terminal 100 desires to perform a CSI service with the second user, e.g., the 2-1 terminal 210, the first terminal 100 sends a CS call setup message (e.g., a SETUP message) directed to the second user's 2-1 terminal 210. This call setup message may include the current terminal capability version of the first terminal 100, such as 1000 0101, for example.

Because the call forward function has been registered, the second IMS core network 420 then sends the call setup message to the second user's 2-2 terminal 220 by use of the registered call forward function (S76).

The 2-2 terminal 220 then sends to the first terminal 100 a connection message CONNECT in response to the received call setup message (S77). The connection message CONNECT may include the current terminal capability version of the 2-2 terminal 220, such as 1000 1001, for example. Accordingly, the CS call is set up between the first terminal 100 and the 2-2 terminal 220.

The first terminal 100 compares the received terminal capability version of the 2-2 terminal 220 with the previously stored terminal capability version of the 2-2 terminal 220. The first terminal 100 then selects and performs the terminal capability information exchange procedure or directly the IMS session connection setup procedure according to the results of the comparison (S78).

That is, if at step S78 it is determined that the received terminal capability version of the 2-2 terminal 220 is different from the stored terminal capability version of the 2-2 terminal 220, the first terminal 100 determines that the terminal capability information of the 2-2 terminal 220 has been changed after performing the previous CSI service, and thus sends an OPTIONS request message to the 202 terminal 220 and exchanges (or receives) the terminal capability information therebetween (S82 and S83). On the other hand, if the received terminal capability version of the 2-2 terminal 220 is determined at step S78 to be equal to the stored terminal capability version of the 2-2 terminal 220, the first terminal 100 determines that the terminal capability information of the 2-2 terminal 220 has not been changed and proceeds directly to an IMS session setup procedure without performing the terminal capability information exchange procedure (S86).

The 2-2 terminal 220, on the other side, compares the received terminal capability version of the first terminal 100 with the previously stored terminal capability version of the first terminal 100, and selectively performs the terminal capability exchange procedure with the first terminal 100 based on the determination results (S79). If the recently received terminal capability version of the first terminal 100 is not equal to the stored terminal capability version of the first terminal 100, e.g., if the received terminal capability version is 1000 0101 and the stored terminal capability version is 1000 0100, for example, then the 2-2 terminal 220 determines that the current terminal capability information of the first terminal 100 has been changed after performing the previous CSI service. The 2-2 terminal 220 accordingly determines to perform the terminal capability information exchange procedure with the first terminal 100 in order to update the terminal capability information of the first terminal stored in the 2-2 terminal 220 to be the same as the actual (changed) terminal capability information of the first terminal 100. The terminal capability information exchange procedure can be started by sending an OPTIONS request message from the 2-2 terminal 220 to the terminal 100 (S80).

The first terminal 100 having received the OPTIONS request message sends its changed terminal capability information using an OPTIONS response message (S81). The OPTIONS response message may even include the terminal capability version of the first terminal 100. The 2-2 terminal 220 receives the changed terminal capability information of the first terminal 100 through the OPTIONS response message and then stores therein the received information.

Afterwards, the first terminal 100 sets the IMS session with the 2-2 terminal 220 according to a known session setup procedure (S86) and exchanges media data therebetween according to the CSI service (S87).

The present invention uses the terminal capability version to determine whether or not the terminal capability information has changed, and requests the terminal capability information from only the terminal having the changed terminal capability information based on the determination. Hence, according to the present invention, steps S80 and S81 and/or steps S82 and S83 for requesting and receiving terminal capability information are not performed if the terminal capability information has not changed, which is determined by comparing the capability versions (values).

In addition, when the terminal capability information related to at least one terminal has been changed after performing the previous CSI service between two terminals which have performed the CSI service before, the terminal capability version can be used to correctly determine whether the terminal capability information of each terminal has been changed, whereby the terminal capability information stored in a local area (i.e., the storage unit) of each terminal can be updated to thus prevent the unnecessary signaling procedures (e.g., S84 and S85) during the IMS session setup. For instance, the process of sending an INVITE message based on inaccurate capability information of another terminal and thus receiving a failed response (S84 and S85) can be avoided since each terminal will always have the accurate capability information of other terminals to be in communication with.

The inventive concepts of FIGS. 7 and 8 are equally applicable to a situation where an IMS session is first set up and then a CS call set up (e.g., FIG. 5) among terminals, some of which have the same public user ID.

Thus, when one user has a plurality of terminals using the same public user ID, unique terminal capability versions different from one another can be generated based upon at least the terminal capability information of each terminal and the generated terminal capability versions can be exchanged during a call setup or a session setup. Accordingly, the present invention enables an originating side terminal and a receiving (terminating) side terminal to determine whether or not the terminal capability information of the other terminal has been changed. Therefore, related art problems, which may occur when using an additional service such as a call forward, can be addressed.

According to the preferred embodiments of the present invention, each terminal can be a UE or a mobile terminal (but not limited thereto), which is capable of providing a CS, a SIP-based service such as an IMS, a combination service such as a CSI, etc. Examples of the terminal can be, but are not limited to, a PT (Push To) client, a mobile phone, a UE (user equipment) for UMTS or the like, an MS (mobile station) for GSM or the like, a laptop computer, a PDA (personal digital assistant), various types of mobile terminals. A PT client can be a PTT (Push To Talk) client such as a PoC (Push-to-talk Over Cellular) client, a PTV (Push To View) client, a PTD (Push To Data) client, etc.

According to the present invention, there are same or similar steps in the first through third embodiments discussed herein. As such, variations discussed in any one embodiment of the present invention can be applied to other embodiments of the present invention, as needed. Also, whenever a terminal receives a capability version of another terminal that is different from the corresponding previously stored capability version, the terminal stores the received capability version as the current capability version of the another terminal. Similar storing is performed for the terminal capability information of the another terminal. Moreover, if it is determined during the comparison of capability versions that there is no stored terminal capability version of a target terminal in a terminal, then the terminal can perform operations to request the capability version and/or the capability information from the target terminal.

The method(s) of the present invention can be implemented in part by using existing computer programming language. Such computer program(s) may be stored in portable or other types of storages or memories such as hard drive, RAM, ROM, PROM, etc. associated with one or more computers or computer-based devices such as the networks and/or the terminals. Alternatively, such computer program(s) may be stored in a different storage medium such as a USB, magnetic disc, optical disc, magneto-optical disc, etc. Such computer program(s) may also take the form of a signal propagating across the Internet, extranet, intranet or other network and arriving at the destination device (e.g., network server(s) or terminal) for storage and implementation. The computer programs are readable using a known computer or computer-based device.

As described above, in the present invention, whenever terminal capability information of each terminal is changed, a unique terminal capability version corresponding to the updated terminal capability information is generated and kept, and a service connection setup message can then be sent by including the terminal capability version therein. Thereafter, an originating terminal and a receiving (terminating) terminal respectively can compare the stored terminal capability information of the other terminal and the received terminal capability version of the other terminal, whereby whether or not the terminal capability information of the other terminal has been changed can effectively be determined.

In addition, in the present invention, when the change in the terminal capability information has been confirmed based upon the received terminal capability version of another terminal, one terminal requests the changed terminal capability information from the another terminal of which terminal capability information has been changed and receives the requested information therefrom, thereby maintaining consistent information in the local storage unit of the one terminal and reducing signaling processes performed for a terminal capability information exchange procedure.

Furthermore, in the present invention, the signaling for a service connection setup can be simplified by confirming whether the terminal capability information of the other terminal has been changed and selectively performing one of a terminal capability information exchange procedure and a service connection setup procedure according to the results of the confirmation.

In the present invention, even when one user has a plurality of terminals using the same public user ID and has registered a call forward function of a receiving side terminal, both the originating terminal and the receiving terminal can respectively confirm whether or not the terminal capability information of the other terminal(s) has been changed, to thus eliminating the use and reliance of inaccurate or old information stored in terminal storage units.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A terminal capable of providing a circuit switched (CS) service, a session initiation protocol (SIP)-based service, or a combination of the CS service and an IP multimedia subsystem (IMS), the terminal comprising:
a controller configured to receive a terminal capability version of at least one target terminal, to obtain a first comparison result by comparing the received terminal capability version with a previously stored terminal capability version of the at least one target terminal, and to request for terminal capability information of the at least one target terminal if the received terminal capability version of the at least one target terminal is different from the previously stored terminal capability version of the at least one target terminal based on the first comparison result,
wherein if the received terminal capability version of the at least one target terminal is the same as the previously stored terminal capability version of the at least one target terminal, then the controller bypasses requesting for the terminal capability information of the at least one target terminal from the at least one target terminal, and proceeds with a CS or IMS process,
wherein the terminal capability version identifies a version of capabilities of the at least one target terminal, and
wherein the terminal capability version of the at least one target terminal has a value in a user equipment capability version-XX (UCV-XX) form, where XX is a 2-digit hexadecimal number.

2. The terminal of claim 1, wherein the controller requests for the current terminal capability information of the at least one target terminal using an OPTIONS message.

3. The terminal of claim 1, wherein the controller receives the terminal capability version of the at least one target terminal from the at least one target terminal during a CS call set-up or an IMS session set-up.

4. The terminal of claim 1, wherein the terminal capability version of the at least one target terminal is a unique value generated based on at least the terminal capability information of the at least one target terminal.

5. The terminal of claim 1, wherein the at least one target terminal includes a second terminal and a third terminal for selectively exchanging their terminal capability information with the controller, and the third terminal is designated by the second terminal to communicate directly with the second terminal based on forward function setting information.

6. The terminal of claim 5, wherein when the controller transmits a setup request message intended for the second terminal based on the forward function setting information, and the third terminal receives the setup request and transmits a terminal capability version of the third terminal to the controller.

7. The terminal of claim 6, wherein the controller obtains a second comparison result by comparing the received terminal capability version of the third terminal with a stored terminal capability version of the third terminal, and determines whether to request for terminal capability information of the third terminal based on the second comparison result.

8. The terminal of claim 7, wherein the controller requests for the terminal capability information of the third terminal, if the received terminal capability version of the third terminal is different from the stored terminal capability version of the third terminal; and
wherein the controller bypasses requesting for the terminal capability information, and proceeds with carrying out a requested service, if the received terminal capability version of the third terminal is the same as the stored terminal capability version of the third terminal.

9. A method for providing a circuit switched (CS) service, a session initiation protocol (SIP)-based service, or a combination of the CS service and an IP multimedia subsystem (IMS), the method comprising:
receiving, by a terminal, a terminal capability version of at least one target terminal;
comparing, by the terminal, the received terminal capability version with a previously stored terminal capability version of the at least one target terminal to obtain a first comparison result; and
sending a message for requesting for terminal capability information of the at least one target terminal from the at least one target terminal, if the received terminal capability version of the at least one target terminal is different from the previously stored terminal capability version of the at least one target terminal based on the first comparison result,
wherein if the received terminal capability version of the at least one target terminal is the same as the previously stored terminal capability version of the at least one target terminal, then the requesting for the terminal capability information of the at least one target terminal from the at least one target terminal is bypassed, and the method proceeds with a CS or IMS process, and
wherein the terminal capability version identifies a version of capabilities of the at least one target terminal, and
wherein the terminal capability version of the at least one target terminal has a value in a user equipment capability version-XX (UCV-XX) form, where XX is a 2-digit hexadecimal number.

10. The method of claim 9, wherein the message is an OPTIONS message.

11. The method of claim 9, wherein the terminal capability version of the at least one target terminal is received from the at least one target terminal during a CS call set-up or an IMS session set-up.

12. The method of claim 9, wherein the terminal capability version of the at least one target terminal is a unique value generated based on at least the terminal capability information of the at least one target terminal.

13. The method of claim 9, wherein the at least one target terminal includes a second terminal and a third terminal for selectively exchanging their terminal capability information with the terminal, and
wherein if the second terminal designates the third terminal to communicate directly with the second terminal based on forward function setting information, and then if the second terminal transmits a setup request message intended for the second terminal, then the method further comprises:
receiving, by the third terminal, the setup request message from the second terminal based on the forward function setting information; and transmitting, by the third terminal, a terminal capability version of the third terminal to the second terminal in response to the setup request message.

14. The method of claim 13, further comprising:
comparing, by the second terminal, the received terminal capability version of the third terminal with a stored terminal capability version of the third terminal to obtain a second comparison result; and
determining, by the second terminal, whether to request for terminal capability information of the third terminal based on the second comparison result.

15. The method of claim 14, wherein the terminal capability information of the third terminal is requested, if the received terminal capability version of the third terminal is different from the stored terminal capability version of the third terminal; and
wherein the request for the terminal capability information of the third terminal is bypassed, and the method proceeds with carrying out a requested service, if the received terminal capability version of the third terminal is the same as the stored terminal capability version of the third terminal.

16. A method for providing a circuit switched (CS) service, a session initiation protocol (SIP)-based service, or a combination of the CS service and an IP multimedia subsystem (IMS), the method comprising:
exchanging, by a first terminal, a capability version of the first terminal and a capability version of a second terminal during a session or connection with the second terminal,
updating, by the first terminal, the terminal capability version of the first terminal if the first terminal's capability information is changed;
transmitting, by the first terminal, an INVITE message for an IMS session setup or CS call setup message for a CS call between the first terminal and the second terminal, the INVITE message including the updated capability version of the first terminal or the CS call setup message including the updated capability version of the first terminal;
comparing, by the second terminal, the received terminal capability version of the first terminal with a stored terminal capability version of the first terminal to obtain a comparison result;
selectively performing, by the second terminal, a terminal capability information request procedure if the received terminal capability version of the first terminal is different from the exchanged terminal capability version of the first terminal based on the comparison result; and
proceeding with the IMS session setup and a CS call setup without the second terminal performing the terminal capability information request procedure, if the comparison result indicates that the received terminal capability version of the first terminal is the same as the stored terminal capability version of the first terminal,
wherein the terminal capability version of the first terminal and the second terminal has a value in a user equipment capability version-XX (UCV-XX) form, where XX is a 2-digit hexadecimal number.

17. The method of claim 16, wherein the terminal capability request procedure uses a SIP OPTIONS message.

18. The method of claim 16, wherein the terminal capability version of the first terminal is a unique value generated based on at least the terminal capability information of the first terminal, and the terminal capability version of the second terminal is a unique value generated based on at least the terminal capability information of the second terminal.

* * * * *